Oct. 15, 1968  C. SICO ET AL  3,405,422

FOOD SKEWERING MACHINE

Filed Jan. 10, 1966  2 Sheets-Sheet 1

INVENTORS
Carmen Sico &
Anthony C. Sico

Oct. 15, 1968  C. SICO ET AL  3,405,422
FOOD SKEWERING MACHINE
Filed Jan. 10, 1966 2 Sheets-Sheet 2
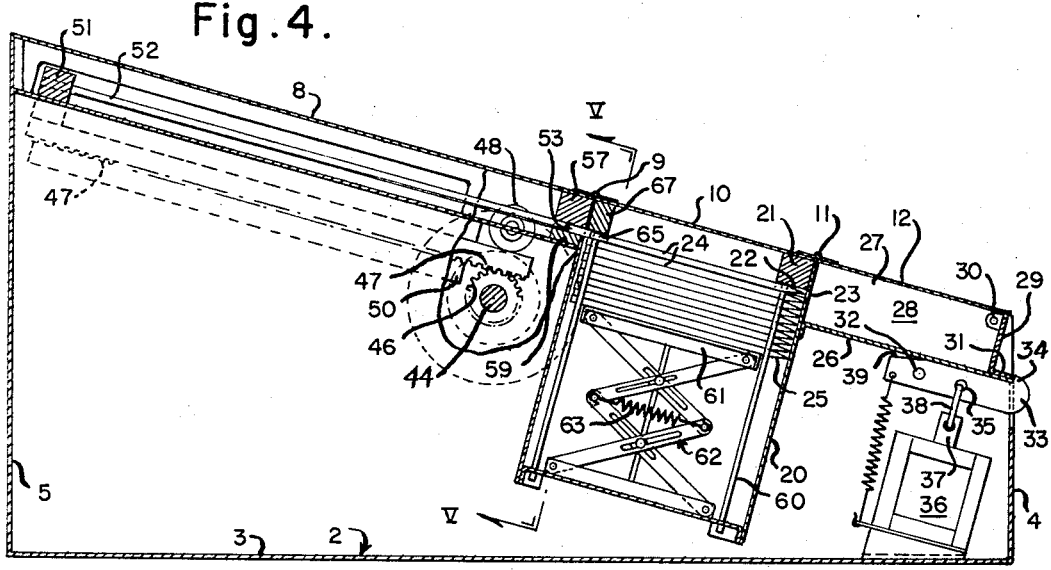
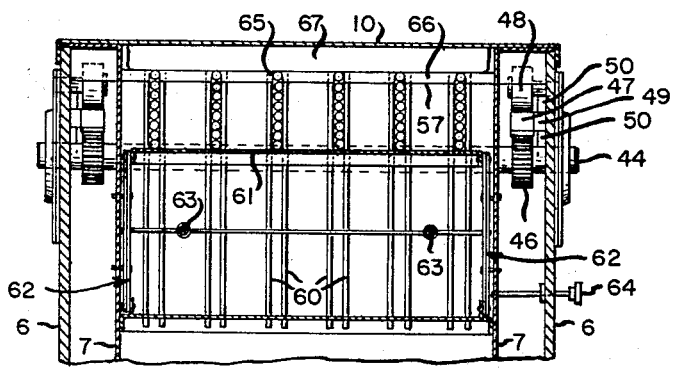
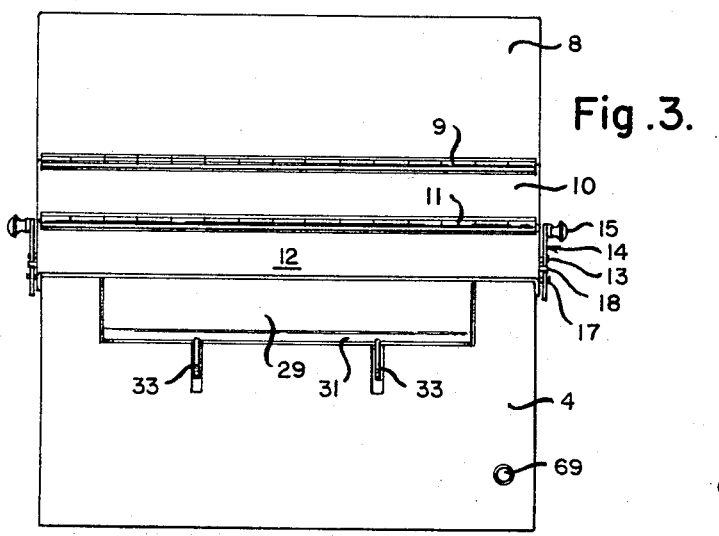
INVENTORS
Carmen Sico &
Anthony C. Sico

United States Patent Office 3,405,422
Patented Oct. 15, 1968

3,405,422
FOOD SKEWERING MACHINE
Carmen Sico, Indiana Township, Allegheny County, and Anthony C. Sico, Pittsburgh, Pa. (both of 4705 Liberty Ave., Pittsburgh, Pa. 15224)
Filed Jan. 10, 1966, Ser. No. 519,712
11 Claims. (Cl. 17—1)

ABSTRACT OF THE DISCLOSURE

A food skewering machine has a downwardly inclined food compartment and a wall member at the upper end of the compartment provided with a plurality of guide slots. A plurality of skewer magazines supply the guide slots with a skewer, then the skewer is engaged by a push rod to force it into food in the compartment.

This invention relates to a food skewering machine, that is to say, a machine for impaling food with skewers. Various food products are prepared by impaling elements of food with skewers, such, for example, as a product known as "city chicken" which consists of pieces of meat impaled with a skewer.

While attempts have been made to mechanically impale food with skewers such attempts have not resulted in any practicable food skewering machine. Food skewering is done manually. The worker holds the food to be skewered in one hand, with or without a steadying device, and impales the food by a skewer held in the other hand. The operation is slow, uneconomical and unsanitary. It is virtually impossible to impale meat with skewers without cutting or lacerating the workers' hands. This not only renders the workers readily subject to infection but also renders the skewered food suspect. Sometimes the hands of workmen are so badly cut and lacerated by manual skewering that the workmen are incapacitated for a period of time. Also it is difficult by manual skewering to produce a uniform skewered product.

We provide a food skewering machine which for the first time to the best of our knowledge and belief makes mechanical food skewering practicable. For purposes of explanation and illustration we shall describe a food skewering machine having six compartments for food to be skewered so that upon each cycle of operation six skewered food products are produced, but it is to be understood that the number of compartments of the machine is optional and may be increased or decreased as desired. In the appended claims reference is made to "a compartment," it being understood that the machine may have a single compartment or a plurality of compartments of any practicable number.

Our food skewering machine comprises a compartment for food to be skewered, skewer guiding means for guiding a skewer to enter the compartment at an end thereof and pass through the compartment, means for pushing the skewer through the compartment to impale food disposed in the compartment, the compartment having a wall at the end thereof opposite the end through which the skewer enters, and means mounting the wall for movement between operative position closing the compartment and serving as a backstop for the food while it is being skewered and inoperative position in which the end of the compartment at which the wall is disposed is open to permit the skewered food to be ejected from the compartment at the open end. Preferably the wall is fastened in operative position during skewering of the food in the compartment and connections are provided releasing the wall for movement to inoperative position to permit the skewered food to be ejected when the skewer has impaled the food in the compartment. Desirably the connections are electrical connections releasing the wall when the pushing means reaches a predetermined position. Control means are provided stopping movement of the pushing means at the conclusion of a skewering operation and withdrawing the pushing means in preparation for a succeeding cycle of operations.

We provide a skewer magazine adapted to contain a supply of skewers and means advancing skewers in the magazine at each cycle of operations to dispose a new skewer in the skewer guiding means. In the form shown in the drawings the skewer magazine is disposed below the skewer guiding means and is adapted to contain a supply of skewers, means including a spring actuated platen being provided urging the skewers upwardly in the magazine to dispose at each cycle of operations a new skewer in the skewer guiding means.

We provide a cover for the food compartment openable to permit food to be introduced thereinto and closable to confine the food in the compartment during skewering together with connections between the cover and the pushing means rendering the pushing means inoperative when the cover is open. More specifically we provide control means for the pushing means, a cover for the compartment openable to permit food to be introduced into the compartment and closable to confine the food in the compartment during skewering together with latch means for latching the cover in closed position and connections between the latch means and the control means rendering the pushing means operative when the cover is latched closed and inoperative when the cover is not latched closed.

The means for pushing the skewers through the compartment to impale food disposed in the compartment may include a rack, a motor mounted in the casing, a pinion meshing with the rack and connections between the motor and pinion for driving the pinion and through the rack operating the pushing means. The pushing means desirably has a pointed forward extremity adapted to engage in the trailing end of the skewer to insure continued operative engagement between the pusher and the skewer after the pusher has moved through the skewer guiding means.

We further provide a food skewering machine comprising a casing, a compartment in the casing for food to be skewered, skewer guiding means for guiding a skewer to enter and pass through the compartment, means for pushing the skewer through the compartment to impale food disposed in the compartment, a first cover for the skewer guiding means hinged to the casing and a second cover for the compartment hinged to the first cover so that the first cover must be closed in order to close the second cover.

We desirably provide latch means for latching the covers closed together with connections between the latch means and the pushing means rendering the pushing means operative when the covers are latched closed and inoperative when the covers are not latched closed.

Other details, objects and advantages of the invention will become apparent as the following description of a present preferred embodiment thereof proceeds.

In the accompanying drawings we have shown a present preferred embodiment of the invention in which FIGURE 1 is a top plan view, partly broken away, with protective covers removed;

FIGURE 3 is an end elevation viewed from the right of FIGURE 2;

FIGURE 4 is a longitudinal section on the line IV—IV of FIGURE 1; and

FIGURE 5 is a transverse section generally on the line V—V of FIGURE 4.

Figure 1:
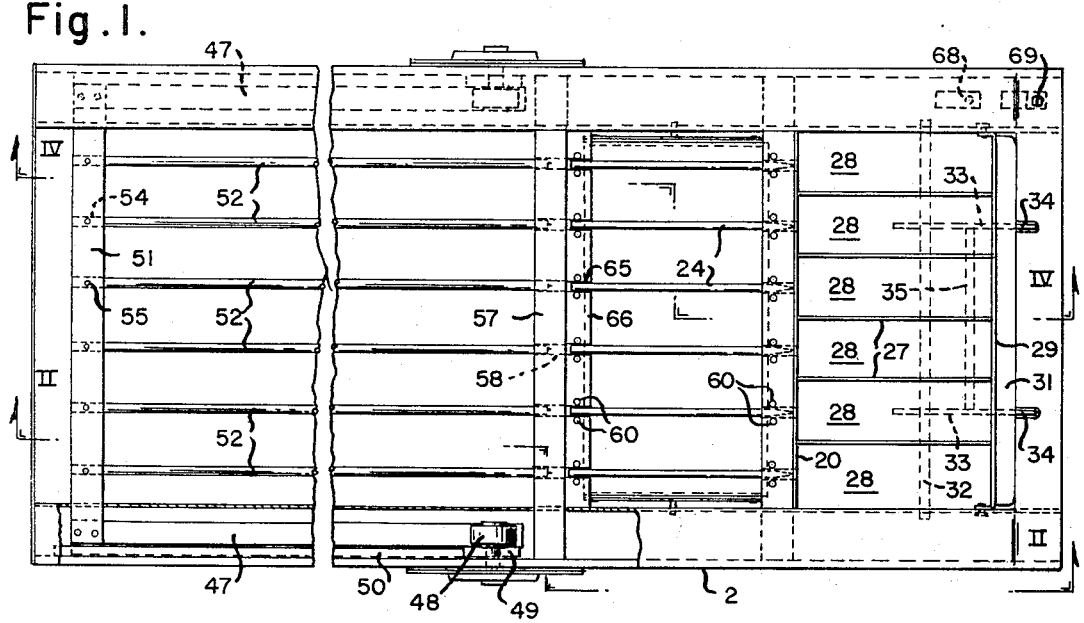
Figure 2:
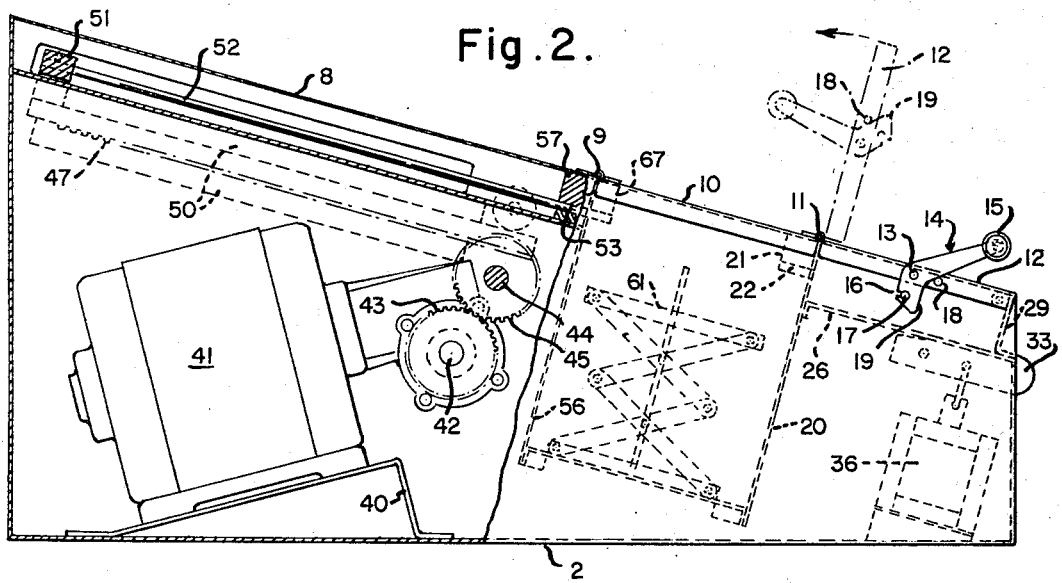
FIGURE 2 is a side elevation, partly in section on line II—II of FIGURE 1.

Referring now more particularly to the drawings, the machine comprises a casing designated generally by reference numeral 2 comprising a bottom 3, a relatively short front wall 4, a relatively tall rear wall 5 and opposed double side walls each having an outer side wall element 6 and an inner side wall element 7. The bottoms of the side walls are horizontal but the tops of the side walls are inclined from the top of the relatively tall rear wall 5 to an elevation above the top of the relatively short front wall 4. Atop the upper portion of the casing is a fixed cover member 8. Pivotally mounted on the casing at 9 is a cover member 10 so that it can swing upwardly to open position about the pivot 9. Pivoted to the cover member 10 at 11 is a cover member 12. When the cover members 10 and 12 are closed the entire top of the casing is closed by the cover members 8, 10 and 12.

Pivoted to each side edge of the cover member 12 at 13 is a latch 14 having a handle 15 and a slot 16 for receiving a stud 17 projecting outwardly from the side wall at that side. When the cover members 10 and 12 are closed they are both latched closed by turning the latches 14 to the positions in which the studs 17 are received in the slots 16. Stops 18 are mounted on the side edges of the cover member 12. When with the cover members 10 and 12 latched closed the latches 14 are turned to disengage the slots 16 from the studs 17 the extremities 19 of the latches engage the stops 18 and continued turning of the latches causes the cover member 12 to swing open about the pivot 11, the cover member 10 remaining closed. When the cover member 12 has turned 180° about the pivot 11 and lies atop the cover member 10 and turning of the latches 14 is continued further the cover member 10 swings open about the pivot 9. Turning of the latches in the opposite direction causes first the cover member 10 and thereafter the cover member 12 to swing to closed position.

A transverse partition 20 perpendicular to the inclined top of the casing extends across the casing with a bar 21 at its top. The bar 21 has six transversely spaced slots 22 extending upwardly thereinto from its lower edge and the partition 20 has six circular openings 23 drilled therethrough in line with the upper portions of the respective slots 22. The width of the slots 22 and the diameter of the openings 23 is slightly greater than the diameter of skewers 24 which have pointed ends 25 and which are normally made of wood but may be made of any other suitable material.

Extending across the casing 2 generally parallel to the inclined top thereof is a partition 26 which extends longitudinally of the casing from the top of the front wall 4 to the partition 20, meeting the partition 20 somewhat below the openings 23 therethrough. A series of five parallel spaced apart planar vertical partitions 27 extend upwardly from the partition 26 and longitudinally from the partition 20 to a location close to the front of the casing 2. The tops of the partitions 27 are in the same inclined transverse plane as the top of the casing. The partitions 20, 26 and 27 form six compartments 28 each adapted to receive food to be skewered, typically pieces of meat to form so called "city chicken" or other skewered food products. The compartments 28 are open at the front of the casing.

A wall or gate 29 is pivoted to the casing at 30 and is adapted to swing in a vertical plane extending longitudinally of the casing between an upper inoperative position in which the compartments 28 are open at the forward end of the casing and a lower operative position closing the forward ends of the compartments. The gate 29 has an outwardly extending lip 31 which may serve as a handle for manipulating the gate and which also serves as a counterweight when the gate swings forwardly and downwardly to operative or closed position to increase the momentum of the gate to assist in depressing latch means now to be described.

Extending transversely of the casing 2 between the inner side wall elements 7 is a rod 32 to which are pivoted parallel latch elements 33 extending generally forwardly from the rod 32 and each having an upwardly projecting detent 34 at its forward end. The latch elements 33 are connected by a rod 35 so that they will operate in unison. A solenoid 36 is fastened to the inside of the front wall 4 of the casing and has a stem 37 extending upwardly which through a link 38 is connected with the rod 35. The solenoid is spring-activated to move the stem 37 upwardly so that the latch elements 33 normally assume their uppermost position which is a position with the detents 34 disposed outside the bottom of the gate 29 holding the gate closed. When the solenoid 36 is energized the stem 37 is drawn downwardly against the action of the spring in the solenoid moving the latch elements 33 downwardly and withdrawing the detents 34 from contact with the bottom of the gate 29. Downward movement of the outer ends of the latch elements 33 is limited by engagement of flattened portions 39 of the inner ends thereof with the under surface of the partition 26. When the latch elements 33 are thus moved downwardly to inoperative position the gate 29 is free to swing forwardly and upwardly about its pivot 30 to permit skewered food products to be ejected forwardly from the compartments 28 as will presently be described.

Fastened to the bottom 3 of the casing is a bracket 40 on which is mounted a reversible electric motor 41. The motor shaft drives through reduction gearing a transverse shaft 42 to which is fixed a pinion 43. Journaled in the casing is a transverse shaft 44 to which is fixed a gear 45 meshing with the pinion 43. The transverse shaft 44 extends through the spaces at the sides of the casing 2 between the outer side wall elements 6 and the inner side wall elements 7. At each side of the casing between the outer side wall element 6 and the inner side wall element 7 the transverse shaft 44 carries a pinion 46. The pinions 46 respectively mesh with racks 47 which overlie the pinions with holddown rollers 48 disposed above the respective pinions 46 maintaining the racks 47 in continuous engagement with the pinions 46. Each rack 47 has extending outwardly from its upper portion above the rack teeth a strip 49 which is disposed between upper and lower guides 50 carried by the inner face of the corresponding outer side wall element 6.

A cross bar 51 extends transversely of the casing between the rearward ends of the racks 47 and connects the racks together so that the cross bar 51 and the two racks 47 together form a U-shaped carriage movable longitudinally of the casing parallel to the inclined top thereof. Six parallel spaced apart push rods 52 each with a pointed forward end 53 have their rearward ends received in bores 54 in the cross bar 51, the push rods being held fastened to the cross bar by set screws 55.

A transverse partition 56 perpendicular to the inclined top of the casing and parallel to the partition 20 extends across the casing with a bar 57 at its top. The bar 57 has six transversely spaced slots 58 extending upwardly thereinto from its lower edge, which slots are closed at the bottom by a bar 59 to form guide passages for the push rods 52. The push rods 52 are always disposed in such guide passages. When the carriage is at its extreme rearward position (toward the top of the inclined upper portion of the casing) the forward ends of the push rods are in the guide passages.

Sets of generally upright rods 60 arranged in pairs are disposed rearwardly of the partition 20 and forwardly of the partition 56 as shown forming guideways or magazines for stacks of skewers which are adapted to be fed upwardly to positions in alignment with the openings 23 and push rods 52, the pointed ends of the skewers being disposed forwardly or toward the lower end of the inclined top of the casing. A skewer feeder in the form of a platen 61 generally parallel with the inclined top of the casing is carried by a tongs 62 urged upwardly by springs 63 adjacent opposite sides of the casing. Latch means 64 are provided for latching the platen 61 in its lowermost position when stacks of skewers are being inserted in preparation for operation. To load stacks of skewers into the machine the platen 61 is depressed against the action of the springs 63 to its lowermost position and latched in that position by the latch means 64 and skewers are inserted into the guideways provided by the pairs of spaced apart rods 60 at opposite ends of the skewers. The skewers are positioned longitudinally between partitions 20 and 56. The rearward end of the topmost skewer of each stack of skewers is disposed in a slot 65 formed between spaced apart projections 66 extending forwardly from the bar 57. A holddown bar 67 is carried by the under side of the cover member 10 so that when that cover member is closed the rearward portions of the uppermost skewers in the stacks are prevented from rising above the slots 65 and hence are maintained in longitudinal alignment with the push rods 52.

After the stacks of skewers have been loaded the cover member 10 is closed and the latch means 64 released. This allows the plate 61 to be urged upwardly by the springs 63 to press the stacks of skewers upwardly so that their rearward ends are pressed upwardly against the bottom of the holddown bar 67 and their forward ends are pressed upwardly against the tops of the slots 22. Thus the topmost skewer of each stack is in position to be pushed forwardly by the corresponding push rod 52 through the corresponding opening 23 and through pieces of meat or other food products in the corresponding compartment 28. On succeeding cycles of operation the stacks of skewers are progressively moved upwardly and successive skewers are similarly operated on.

In operation of the machine, with the carriage consisting of the racks 47, the cross bar 51 and the push rods 52 in its rearmost position and the gate 29 latched closed, after stacks of skewers have been loaded into the machine as above described and the cover member 10 closed and the latch means 64 released food to be skewered, such, for example, as pieces of meat, is placed in the compartments 28. When all the compartments 28 have been filled with food to be skewered the cover member 12 is closed and latched in closed position. Closing of the cover member 12 closes a switch 68 which sets up the electrical system of the machine for operation. When the switch 68 is open the machine will not operate.

At the beginning of each cycle the push rods are, as above indicated, withdrawn in their extreme rearward position, i.e., toward the upper end of the inclined top of the casing. To operate the machine the operator presses a push button 69 which starts the motor 41 in operation in a direction to move the push rods forward. Each push rod engages the rear end of the topmost skewer, the pointed forward end 53 of the push rod entering the rearward end of the skewer to insure continued proper alignment of push rod and skewer. Each skewer is by the corresponding push rod pushed forward through the corresponding opening 23 and through the food which has been placed in the corresponding compartment 28. The gate 29 which is latched closed resists forward movement of the food while it is being skewered. When the forward pointed ends of the skewers have completely impaled the food in the compartments 28 the solenoid 36 is operated to unlatch the gate 29 so that continued forward movement of the push rods pushes the skewered food forwardly and opens the gate 29 and ejects the skewered food through the open forward ends of the compartments 28.

When the skewered food has been thus ejected from the compartments 28, i.e., when the push rods have advanced to a predetermined point, the motor 41 is reversed and the push rods are returned to their starting position. The solenoid 36 is deenergized and the forward ends of the latch elements move upwardly to operative position to latch the gate 29 in closed position when it drops after the skewered food has passed out of contact with the gate. Upon return of the push rods to their starting position the next skewer in each stack advances to the top in alignment with the corresponding opening 23 and the corresponding push rod ready for the succeeding cycle. When the push rods reach their fully withdrawn position the motor stops. The cover member 12 is opened, the compartments 28 are again filled with food to be skewered, the cover member 12 is closed and latched, closing the switch 68, and the operator, making sure that the gate 29 is latched closed, again pushes the push button 69 to initiate the next cycle of operation of the machine.

Thus we provide for rapidly and economically skewering food, completely eliminating all manual skewering operations, eliminating the hazard to workers and avoiding the handling of food by workers whose hands have been cut by skewers. Also a much more uniform skewered food product is produced by the machine than is produced by hand skewering. The operation is rapid and economical and makes feasible the preparation of skewered food products when heretofore their preparation has not been feasible.

While we have shown and described a present preferred embodiment of the invention it is to be distinctly understood that the invention is not limited thereto but may be otherwise variously embodied within the scope of the following claims.

We claim:

1. A food skewering machine comprising: a compartment for food to be skewered; a plurality of skewer guiding means for guiding skewers to enter and pass through the compartment to impale food disposed in the compartment; at least one skewer magazine disposed below the skewer guiding means and adapted to contain a supply of skewers; means including a spring actuated platen urging the skewers upwardly in the magazine for positioning one skewer in one each of said skewer guiding means after each cycle of operation; and means for urging the guided skewers substantially simultaneously into said compartment.

2. A food skewering machine as set forth in claim 1 wherein said urging means includes a plurality of elongated push rods, one each of which is aligned with each of said guide means; a rack operatively connected with said push rods; and motor means for driving said rack.

3. A food skewering machine as set forth in claim 2 including cover means for said compartment openable to permit food to be introduced into said compartment and closable to confine the food in the compartment during skewering; and latch means for latching the cover means in closed position.

4. A food skewering machine as set forth in claim 3 including control means for starting and stopping said motor means and operative with said cover means such that said motor means will be stopped when said cover means is open and started when said cover means is closed.

5. A food skewering machine as set forth in claim 3 wherein said cover means includes a first cover for said skewer guide means hingedly mounted thereon; and a second cover for the compartment hinged to the first cover such that the first cover must be closed in order to close the second cover.

6. A food skewering machine comprising: a downwardly inclined compartment for food to be skewered; a wall member fixed to the upwardly positioned end of said compartment, said wall member having a plurality of uniformly spaced guide slots for guiding skewers to enter and pass through the compartment impale food disposed in the compartment; a plurality of skewer magazines lying generally in vertical planes including each of said guide slots; means for aligning skewers with each of said guide slots; means including a spring actuated platen urging the skewers upwardly in said magazine for urging one skewer against said aligning means into poition in one each of said guide slots after each cycle of operation; a plurality of downwardly inclined elongated push rods one each of which is aligned with each of said guide slots; a rack operatively connected with said push rods; and motor means for driving said rack.

7. A food skewering machine as set forth in claim 6 including cover means for said compartment openable to permit food to be introduced into said compartment and closable to confine the food in the compartment during skewering; and latch means for latching the cover means in closed position.

8. A food skewering machine as set forth in claim 7 including control means for starting and stopping said motor means and operative with said cover means such that said motor means will be stopped when said cover means is opened and started when said cover means is closed.

9. A food skewering machine as set forth in claim 7 wherein said cover means includes a first cover for covering said skewers and said wall member; and a second cover for the compartment hinged to the first cover such that the first cover must be closed in order to close the second cover.

10. A food skewering machine as set forth in claim 6 wherein the lower end of said compartment is open; said cover means encloses said lower end when said cover means is closed and opens said lower end when open such that skewered food will drop out of said lower end.

11. A food skewering machine as set forth in claim 9 wherein said aligning means is integral with said first cover.

References Cited

UNITED STATES PATENTS

| 2,303,566 | 12/1942 | Majestic | 17—1 |
| 3,213,486 | 10/1965 | Blake | 17—1 |
| 3,234,585 | 2/1966 | Snyder | 17—1 |

LUCIE H. LAUDENSLAGER, *Primary Examiner.*